United States Patent [19]

Albanese et al.

[11] 4,184,154
[45] Jan. 15, 1980

[54] RANGE AND ANGLE DETERMINING DOPPLER RADAR

[75] Inventors: Damian F. Albanese, Chatsworth; Henry R. Kennedy, Los Angeles; Jack W. Goodwin, Canoga Park, all of Calif.

[73] Assignee: International Telephone and Telegraph Corporation, New York, N.Y.

[21] Appl. No.: 698,192

[22] Filed: Jun. 21, 1976

[51] Int. Cl.² ............................................. G01S 9/37
[52] U.S. Cl. .................................. 343/9 R; 343/10; 343/17.5
[58] Field of Search ................................... 343/9, 17.5

[56] References Cited
U.S. PATENT DOCUMENTS

3,388,398  6/1968  Kratzer et al. ......................... 343/17.5
3,900,873  8/1975  Bouvier et al. ................. 343/17.5 X Primary Examiner—T. H. Tubbesing
Attorney, Agent, or Firm—William T. O'Neil

[57] ABSTRACT

A range, angle, and Doppler (velocity) measuring radar in which a CW, PRC radar floodlights a volume of interest. A receiving antenna in the form of a linear array generally broadside with respect to the bisector of the volume of interest is commutated (sampled) element-by-element to provide a phase modulated received signal from which angle information may be derived. Autocorrelation of the PRC signal received against the transmitted code provides for range determination and a Doppler filter bank is provided corresponding to each discrete receiving angle, the outputs indicating range and velocity of a target at each discrete angle of reception.

16 Claims, 21 Drawing Figures

ADVANCED RANGE - ANGLE - DOPPLER RADAR

PRC SIGNAL GENERATION PRIOR ART

PRC CODE

AUTOCORRELATION FUNCTION

BASIC PRC AUTOCORRELATION PRIOR ART

TO ELIMINATE DOPPLER AMBIGUITIES:
$\frac{1}{T_\omega}$ = PRC CODE RPETITION FREQ $\geq 2f_d$ (MAX)

FIG. 3   PRC RADAR AMBIGUITY DIAGRAM

FIG. 4   BASIC ANGLE MEASURING TECHNIQUE

ANGLE MEASURING RADAR RECEIVER SPECTRA

FIG. 6 ANGLE MEASURING RADAR ANTENNA OUTPUT SPECTRAL COMPONENTS

FIG. 7  BASIC ANGLE GATED RADAR

FIG. 8  BASIC ANGLE GATED RADAR ANGLE COVERAGE

FIG. 9 ADVANCED RANGE - ANGLE - DOPPLER RADAR

FIG. 10  ADVANCED RANGE-ANGLE-DOPPLER RADAR TIMING

FIG. 11  SIMULATING ANTENNA MOTION BY SWITCHING

FIG. 12  POTENTIAL FIRE CONTROL APPLICATION

FIG. 13  TYPICAL ANTENNA ASSEMBLY

RANGE AND ANGLE DETERMINING DOPPLER RADAR

BACKGROUND OF THE INVENTION

1. Field of the Invention

The invention relates to radar systems generally, and more particularly to radar equipments which transmit pseudo-random binary coded continuous-wave signals and which have electronic means for angle determination associated therewith.

2. Description of the Prior Art

In the prior art the so-called pseudo-random-coded radar concept is, of itself, well known. The text "Modern Radar"—Analysis, Evaluation and System Design, by Random S. Berkowitz, published by John Wiley and Sons, Inc., New York, London and Sydney, (3rd Printing, August 1967, Library of Congress Catalog No. 65-21446, is one of many references describing this technique commonly known as PRC radar. Chapter 4 of the aforementioned text, entitled "Pseudo-random Binary Coded Waveforms," is particularly pertinent as an elementary reference in respect to PRC radar systems and concepts. The advantages in respect to high average power-on-target, favorable signal-to-noise ratio, and accuracy of range determination, as well as adaptability to Doppler velocity determination have long been well understood in this art.

The synergistic combination of the present invention also borrows from the so-called Doppler scanning radar technique, also known per se, in certain prior art forms. The structural aspects of such simulated Doppler systems are of interest as background, although the present invention is a new arrangement and combination of the commutated array technique combined with pseudo-random coding of the carrier.

The so-called Doppler scanning guidance system has been extensively described in the patent literature and other technical literature. For example, U.S. Pat. Nos. 3,626,419; 3,670,337; 3,728,729; and 3,754,261 are typical of the patent literature relating to this "simulated" Doppler technology. Also, the technical publication "Electrical Communication," published quarterly by International Telephone and Telegraph Corporation, contains a basic and quite complete description of that particular prior art as applied to Doppler navigation beacons in Volume 46, No. 4 (1971) beginning at Page 253.

Still further, U.S. patent application Ser. No. 634,890 filed Nov. 24, 1975, now U.S. Pat. No. 4,042,925 entitled Pseudo-Random Code (PRC) Surveillance Radar, describes an advanced PRC radar system in which the inherent range and Doppler determination ambiguities in PRC radar systems are dealt with to produce an optimum system in which the first range ambiguity was extended well beyond the useful range of the system, and in which Doppler ambiguities (i.e., target velocity multiples providing essentially the same Doppler response) are also placed beyond the velocity range of interest. That technology may be considered directly applicable to the present invention. The theory described in the aforementioned patent application Ser. No. 634,890, which is assigned to the assignee of the present application, is also helpful in appreciating the advantages to be obtained from the particular combination of the present invention.

SUMMARY OF THE INVENTION

It may be said to have been the general objective of the present invention to provide a radar system allowing nearly instantaneous measurement of range, angle, and Doppler, in respect to multiple targets lying within a volume being floodlighted by a radar transmitter.

The present invention involves a unique marriage of pseudo-random code (PRC) range measuring technology and the so-called simulated Doppler angle measuring concepts as referred to hereabove under the prior art discussion specifically.

The commonality between the two technologies of the foregoing is that both utilize continuous waveform (CW) and both are inherently capable of providing target Doppler (velocity) measurements. The resulting novel combination provides a low probability of intercept, good clutter performance, anti-jam and anti-ARM performance. The system has simultaneous coverage at all angles of interest and a capability for either surveillance or weapon fire control functions.

Pseudo-random coding is actually by a maximum length sequence, that is, one which repeats immediately after the end of each predetermined code word without hiatus. It is important to distinguish at the outset of this description between the simulated Doppler implied in the so-called Doppler navigation beacon art hereinbefore identified, on the one hand, and target Doppler components due to actual target movement with respect to the radar site at a predetermined ground location. In the so-called Doppler navigation beacon, a signal is transmitted successively from the elements of the linear array by commutation, and, at the airborne station the effect is much the same as if the antenna were physically moving, producing a "simulated" Doppler effect from which the airborne station can derive navigation angle information. In the combination of the present invention on the other hand, the commutated antenna receives only, the targets having been separately illuminated from a separate transmitting antenna which covers at least the space sector of interest. This transmitting antenna radiates the CW signal, bi-phase modulated by the pseudo-random maximal length sequence. Thus, the commutated receiving array effectively imposes a phase modulation on received signals and, as this description proceeds, it will be seen that an individual spectrum line corresponds to each of the discrete angles in space selected in accordance with criteria which will be better understood as this description proceeds. The receiver circuitry connected to the commutated receiving antenna actually comprises a corresponding plurality of receiver channels each supplied with a different local oscillator signal and each having the same predetermined IF bandwidth. Thus, each of those channels responds only to received signals corresponding to a particular angle in space. This concept forms the basis for effectively angle-gating received signals, the range determination being subsequently accomplished by autocorrelation of the received pseudo-random sequence against the transmitted code of the same form. Doppler determinations are made typically by Doppler filter banks responsive to each of these receiver channels.

The details of instrumentation of the novel concepts and combination of the invention will be evident as this description proceeds.

DESCRIPTION OF THE PREFERRED EMBODIMENT

Before describing the system arrangement according to the present invention, it is considered useful to review the techniques of pseudo-random coding, and to begin that discussion, reference is made to FIG. 1.

Figure 1A:
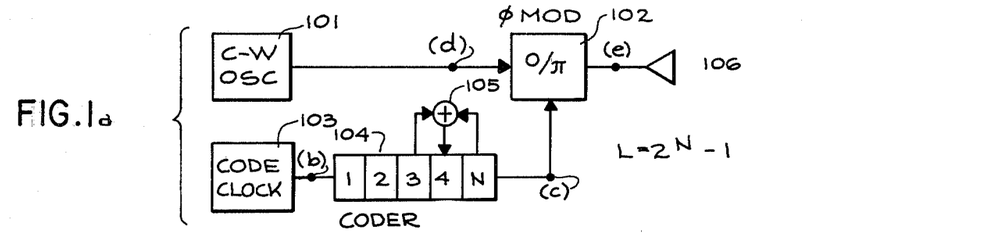
FIGS. 1(a) through (e) depict PRC sequence generation with waveforms.
Figures 1B, 1C, 1D:
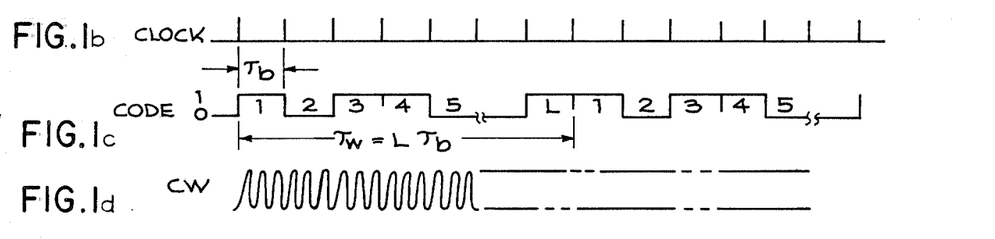
Figure 1E:
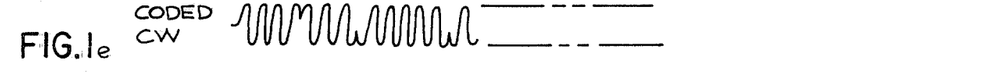

In FIG. 1(a) a CW oscillator-transmitter 101 feeds a bi-phase modulator 102 which codes, or modulates the carrier on lead (d) in accordance with pseudo-random sequence and feeds this to an antenna 106. The actual coder 104 may be of the well known shift register type with feedback connection 105, arranged to produce the code on lead (c). The code clock 103 produces a master timing pulses as illustrated in FIG. 1(b). These are spaced $\tau_b$ which is the bit duration of the code and FIG. 1(c) is the code itself. The output of 101 is a steady CW signal represented at FIG. 1(d), and after being modulated in 102 in accordance with the code of FIG. 1(c), the waveform of FIG. 1(e) is produced and applied to the antenna 106. Ordinarily in a PRC system, the antenna 106 (and this is the case in respect to the present invention also) may be a relatively simple antenna for producing a relatively broad beam of energy over a sector of space of interest.

In the code the total time of the maximal length sequence before it repeats is the word "duration" $\tau_w$ which is equal to the product of L and $\tau_b$. L, on the other hand, equals $2^N-1$ which is the length of the code word as a function of the number of states N of the shift register 104. In the illustrated case, N=5 and L is therefore 31. It will be understood that the invention is of course not limited to this or any of the other specific parameters recited. The reasons for the choices made will be apparent as this description proceeds in connection with the description of the particular embodiment designed for the achievement of certain performance characteristics.

Figure 2A:
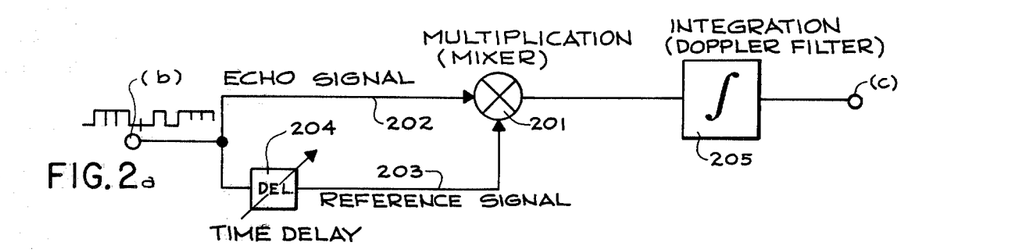
FIGS. 2(a) through 2(c) depict the autocorrelation concept with waveforms.
Figure 2B:
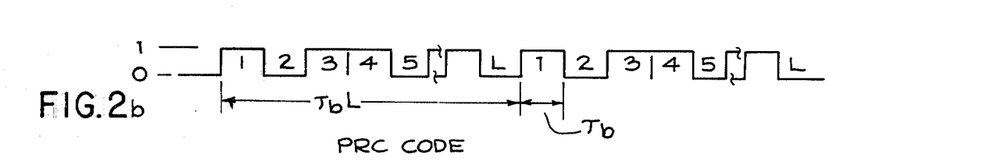
Figure 2C:
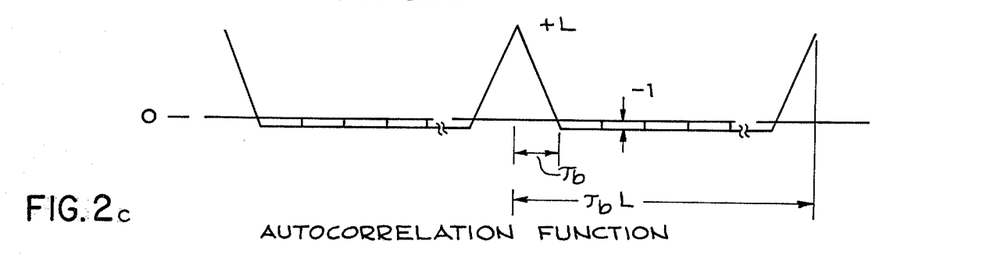

Referring now to FIGS. 2a-2c, the PRC autocorrelation function will be seen at FIG. 2(c). Classically, the code according to FIG. 2(b), which is that of FIG. 1(c), is multiplied by itself in a mixer 201. The echo signal as present in lead 202, may be thought of as the received signal and on lead 203 the code is present delayed by an amount D in 204. This signal on 203 is the local or reference code signal. Depending upon the alignment of these two code signals as they are applied to 201, an autocorrelation function in accordance with FIG. 2(c) is produced. As these codes "slip" by each other, due to the changing range of a moving target echo signal, peaks at a value of +L are produced with spacing $\tau_b L$ spacing as seen. For a time $\tau_b$ on either side of a correlation peak, the amplitude of the correlation peak, the amplitude of the correlation function decreases until it reaches a value of $-1$ between the correlation peaks. The signals shown at FIG. 2(b) as present on 202 and 203 may be thought of as video domain signals having instantaneous amplitudes of either 1 or 0 and which appear to occur randomly, hence the name pseudo-random code.

In FIG. 2(a), a Doppler filter 205 is shown through which a discrete value of target Doppler may be isolated, thus, for a particular value of the delay 204 and for a particular frequency response of 205, a discrete target range and velocity is detected.

For maximal length pseudo-random codes (sequences) as employed in the embodiment being described, the resultant autocorrelation function, FIG. 2(c), always has the same shape. The peak of the autocorrelation function may otherwise be thought of as occurring when the codes are aligned bit-for-bit, giving an amplitude of L, i.e., an amplitude value of 31 in this instance. The range discrimination or resolution time provided is equivalent to a conventional pulse system with a pulse width equal to $\tau_b$. The transmitted signal as PRC modulated is wideband (approximately twice the code clock rate) and therefore, when received must be handled by wideband circuits until after the detection function has been completed. This will be more fully evident at a later point in this description.

Figure 3:
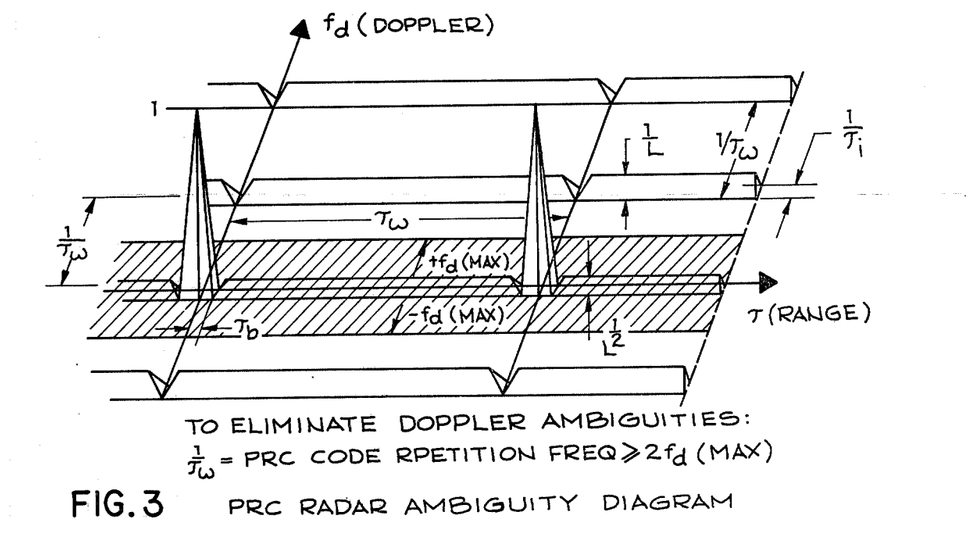
FIG. 3 is a classical PRC radar ambiguity diagram illustrating the development of ambiguous range and Doppler responses.

Referring now to FIG. 3, a more or less self-explanatory ambiguity diagram of a classical type is presented. The term $f_d$ is target Doppler frequency while $\tau$ is representative of range.

It is intuitively obvious that, for the correlation described in connection with FIG. 2, the same response is obtained every $\tau_w$ (relative slip) between the received and local codes. That is, the response is ambiguous to the extent that it might be indicative of a range $\tau_w$ or a multiple thereof. Although not specifically a part of the present invention, the reader will recall that reference was made to U.S. patent application Ser. No. 634,890 filed Nov. 24, 1975, entitled Pseudo-Random Code (PRC) Surveillance Radar, which describes a fully applicable technique for dealing with this range ambiguity problem. For the sake of relative simplicity however, that additional disclosure has been omitted from this specification, since, although it is a highly desirable addition, it is not germaine to the concepts and specifics of the present invention, per se.

As is more or less standard, a relatively short code word $\tau_w$, such as the 31 bit word assumed in this embodiment, it is required in order that the reciprocal of $\tau_w$ which is the PRC code repetition frequency is equal to or greater than twice $f_d$ (max). The value $f_d$ (max) is, of course, the maximum expected Doppler velocity. The description in the aforementioned U.S. patent application Ser. No. 634,890 makes the same choice in respect to the elimination of Doppler velocity ambiguities but employs a multiple clock frequency with associated logic circuits for recognizing and eliminating false range responses out to a range much extended beyond the prima facia redundant range of $\tau_w$.

In FIG. 3, the "0" Doppler lobes are seen to be down by $1/L^2$ from the main response and the Doppler ambiguity sidelobes, although non-existent for in-range (or zero range) are $1/L$ times the power in the main lobe for out-of-range conditions. The width of the Doppler sidelobes, as well as the main response lobes, is approximately $1/T_i$ where $T_i$ is the available integration time, or the time the transmitter dwells on the target.

Figure 4:
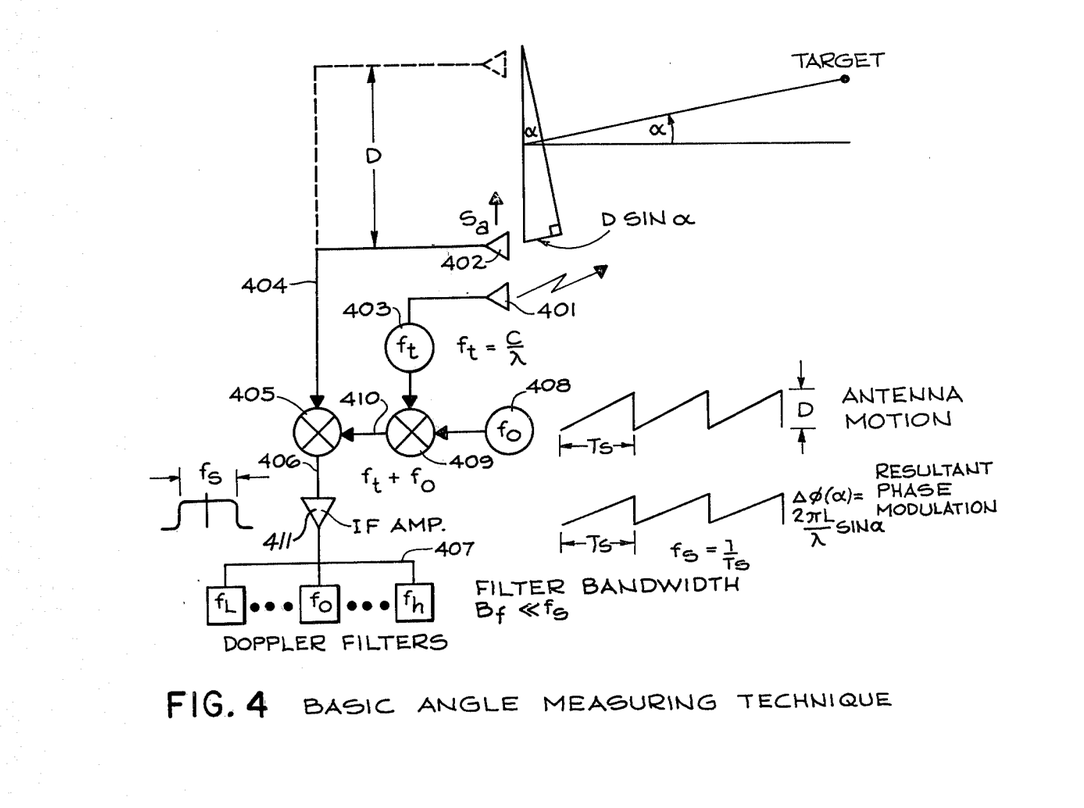
FIG. 4 shows the basic angle-measuring concept which forms a part of the invention.

Proceeding to FIG. 4, the basic angle measuring technique included in the invention is described in elementary form.

Assume a substantially omni-directional antenna 401 excited by transmitter 403 at frequency $f_t$, and a receiving antenna 402 which moves laterally a distance D in time $T_s$, then back in zero time (sawtooth motion) as shown. The antenna 401 radiates a CW signal and 402 receives reflected energy from the target illuminated by 401. Further assume that the target is stationary and the discussion is confined to the plane of the paper. If a stationary target is at angle $\alpha$, then the motion of the antenna 402 will phase-modulate the return signal on lead 404 at $f_t$ linearly with time as shown on FIG. 4. Note that the maximum phase angle at a given space angle $\alpha$ measured from a line normal to the antenna motion is $$\Delta\phi(\alpha) = \frac{2\pi D}{\lambda} \sin\alpha$$

It is well known from phase modulation theory that the resultant frequency spectrum at the antenna output 404 will consist of discrete lines (assuming infinite integration) around $f_t$ spaced $f_s = 1/T_s$, where $f_s$ is the frequency of this antenna motion and $T_s$ is its period. The amplitude of the lines will depend on $\Delta\phi(\alpha)$ the peak modulation on the return from a target angle $\alpha$.

Figure 5A:
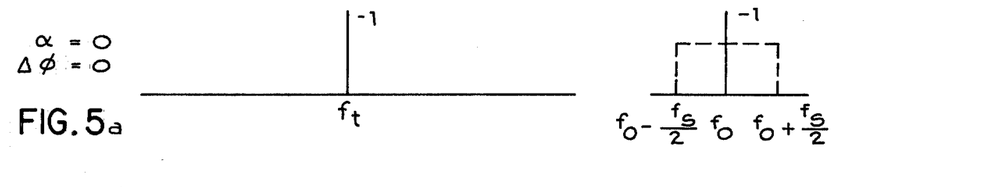
FIG. 5 illustrates the development of discrete receivers spectra corresponding to predetermined space angles.

Before looking at the general case, it will be instructive to look at the easily predicted results. Start with the case of $\alpha = 0$ (i.e., target on the antenna (normal) boresight). In this case $\Delta\phi(0) = 0$, and the antenna output is a single line spectrum at $f_t$. After mixing in mixer 405, this results in a frequency at $f_o$ on lead 406 and the central filter in the filter bank 407 is excited. A local oscillator 408 at frequency $f_o$, and mixer 409 operate to provide a mixer reference on lead 410 at $f_t + f_o$. FIG. 5(a) depicts this condition, i.e., $f_o$ on lead 406.

Now let $\alpha$ increase in an arbitrarily positive direction. If we let $\alpha$ take on a value such that $\Delta\phi = 2\pi$, then again a single line exists at the antenna output at $f_t + f_s$. This result is easily seen since the return signal $f_t$ is being phase-shifted exactly $2\pi$ degrees on each scan which is equivalent to being modulated continuously in phase with a phase-time slope $2\pi/T_s = 2\pi f_s$. As is well known, the result of a linear phase modulation on a carrier frequency $f_t$ is a single frequency at $f_t + f_s$. This principal is well known in the technology of single-sideband modulation, especially in respect to the so-called serradyne modulator to produce a single spectral line offset from a carrier frequency.

Figures 5B, 5C:
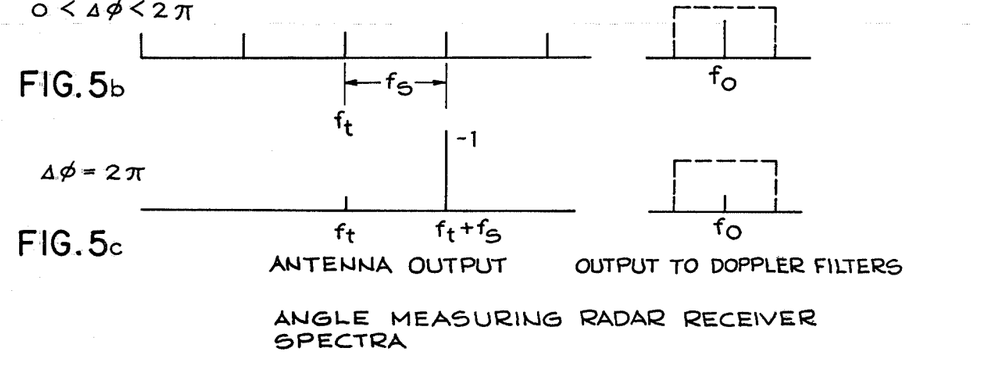

If the i-f amplifier 411 at $f_o$ following the mixer 405 in FIG. 4 has a bandwidth of $f_o \pm f_s/2$, then the resulting line at $f_t + f_s$ will not get through and the filter bank will not be excited. This is illustrated in FIG. 5(c). If $\alpha$ takes an intermediate value such that $0 < \Delta\phi(\alpha) < 2\pi$, then, in general, energy will appear at $f_t$ and $f_t \pm n f_s$ where n is an integer. In this general case, depicted at FIG. 5(b), only the energy at line $f_t$ will get through and excite the filter at $f_o$.

Therefore, in general, as $\alpha$ moves from $\alpha = 0$ ($\therefore \Delta\phi = 0$) in a positive direction, the output at $f_o$ will start at a maximum and drop to zero at an angle $\alpha$ corresponding to $\Delta\phi(\alpha) = 2\pi$.

Let the angle $\alpha$ at which $\Delta\phi = 2\pi$ now be determined. Since $$\Delta\phi(\alpha) = \frac{2\pi D}{\lambda} \sin\alpha = 2\pi$$

$$\sin\alpha = \frac{\lambda}{D}$$

for $\frac{\lambda}{D} << 1$ (i.e. small $\alpha$)

$$\alpha \approx \frac{\lambda}{D}$$

Note that this is just the beamwidth of a rectangular antenna of length D operating at a wavelength of $\lambda$, or the first null on its sin X/X beam pattern.

If the angle $\alpha$ is extended beyond $\lambda/D$, the resultant spectrum out of the antenna will be a single line at $f_t \pm n f_s$ for angles of $\alpha$ which result in $\Delta\phi = \pm n 2\pi$. These angles of $\alpha$ must correspond to $\alpha = \pm n (\lambda/D)$ or at integral antenna beamwidth angle. (For simplicity, the approximation $\alpha = \pm n (\lambda/D)$ is used although it must be corrected for large angles).

The general case showing the sideband amplitudes of the phase-modulated spectrum has been worked out by R. C. Cummings and presented in the Proceedings of the IRE, February 1957, PP 175-186, and the result is shown in the self-explanatory FIG. 6, interpreted for our example.

This result shows that the output of our receiver of FIG. 4 [which can only respond to the $f_t$ (n=0) line because of the filtering] will trace out a sin X/X response as the space angle $\alpha$ is varied. This again is what would be expected from an ideal rectangular antenna looking broadside. In effect, then, the receiver has provided an angle gate around $\alpha = 0$.

If we now place in parallel with the receiver of FIG. 4 another receiver (FIG. 7) with its local oscillator offset from the first receiver by $f_s$, then we will have an angle gate (sin X/X antenna response) around the angle $+\lambda/D$. This can be seen by looking at the $n=1$ ($f_t + f_s$) component in FIG. 6, which has its maximum at $\alpha = \lambda/D$. Similarly, by placing parallel receivers with their local oscillators at $f_t \pm n f_s + f_o$, we generate a set of angle gates or simultaneous antenna beams in space. Note that the receiver channels are all identical, and the components of FIG. 7 are readily recognized from FIG. 4. FIG. 8 shows still more graphically the situation hereabove developed.

There is to be understood to be a receiver channel associated with each antenna beam in space, and each receiver responds (except for the sin X/X sidelobe response) only to targets in the corresponding beam.

Figure 6:
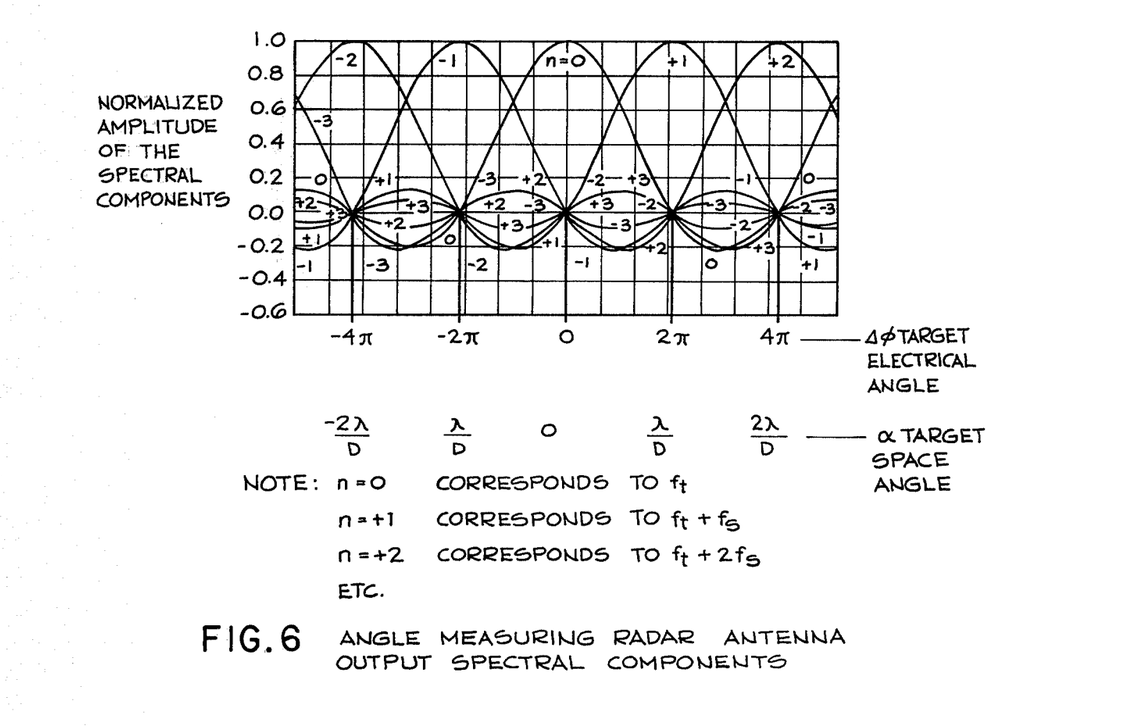
FIG. 6 illustrates, in graphical form, the amplitudes of spectral components relating to FIGS. 4 and 5.
Figure 7:
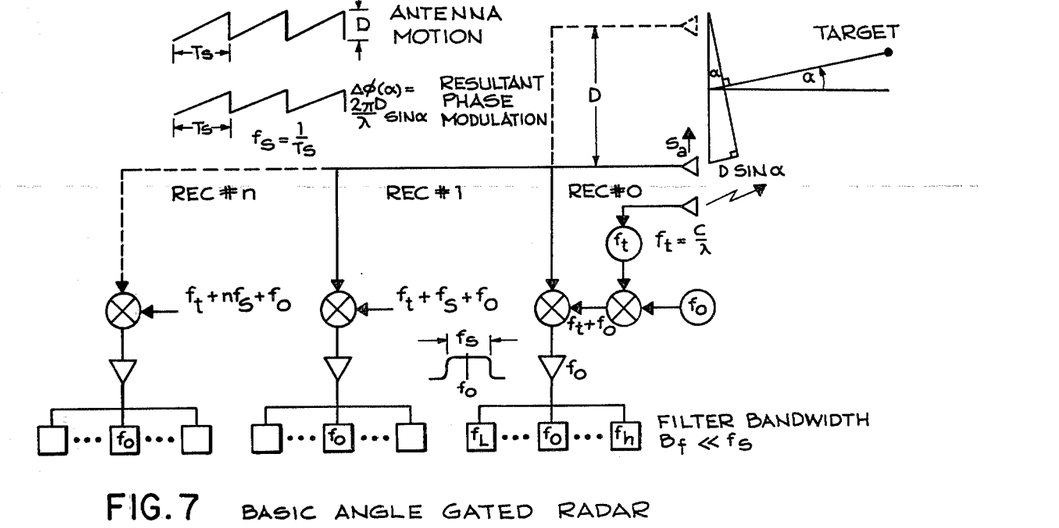
FIG 7 illustrates the extension of the concept of FIG. 4 to produce angle gating of receive signals.

Note again from FIG. 6, that when a target is exactly at $\alpha = n\ (\lambda/D)$ (center of n-th beam in FIG. 8) only receiver n will have a response. However, when the target moves off the beam center, there will be coupling between receiver channels per the sin X/X response. For example, when a target lies at the point where two beams intersect $(\lambda/2D; 3\lambda/2D - -)$, there will be equal response in the two receiver channels associated with the two intersecting beams, as well as smaller responses in the other receivers.

It will be realized by those skilled in this art that the equivalent of a scanning beam can alternatively be achieved by using one receiver whose local oscillator is sequentially switched to the proper offset frequency.

To examine the effect of a moving target, take the simple case where the target is moving directly (radially) toward the antenna at $\alpha = 0$. As stated earlier, it the target is stationary at $\alpha = 0$, only a single line at $f_t$ appears at the antenna output. This is translated down to $f_o$ and rings filter $f_o$. If the target at $\alpha = 0$ has a radial velocity which causes a Doppler shift $f_d$, then a single line again will appear at the antenna output at $f_t + f_d$. After translation, it will appear at $f_o + f_d$ and will ring one of the filters in the Doppler filter bank. As long as the maximum Doppler $$f_d\text{max} \leq f_s/2$$

where $f_s$ = antenna scan frequency, the Doppler shift will not cause an ambiguity in the angle measurement. For example, if the Doppler shift were equal to $f_d = f_s$, then the target would appear to be in the next angle "bin." The significant point, then, is that if $$f_d\text{max} \leq f_s/2$$

there is no coupling between the angle and Doppler measurement.

It is obvious then that targets at $\alpha = (n\lambda/D)$ (the center of the n-th antenna beam) moving radially toward the antenna will produce a Doppler component in the n-th receiver as described for the $\alpha = 0$ case above.

In the general case where the target is off the beam centers, all the resulting spectral lines out of the receiving antenna are shifted by $f_d$, the target Doppler. This will cause the filters at $f_o + f_d$ for each receiver channel to be energized. The levels into each filter will be determined by sin X/X response of FIG. 6. Remember that for the general stationary target, the filters at $f_o$ in each receiver channel were energized.

Therefore, except for the sin X/X coupling between receivers due to the angle measurement, the n-th receiver measures the Doppler of the target associated with the n-th antenna beam. In effect, discrete angle gates are formed by the first mixer of each receiver channel.

Figure 9:
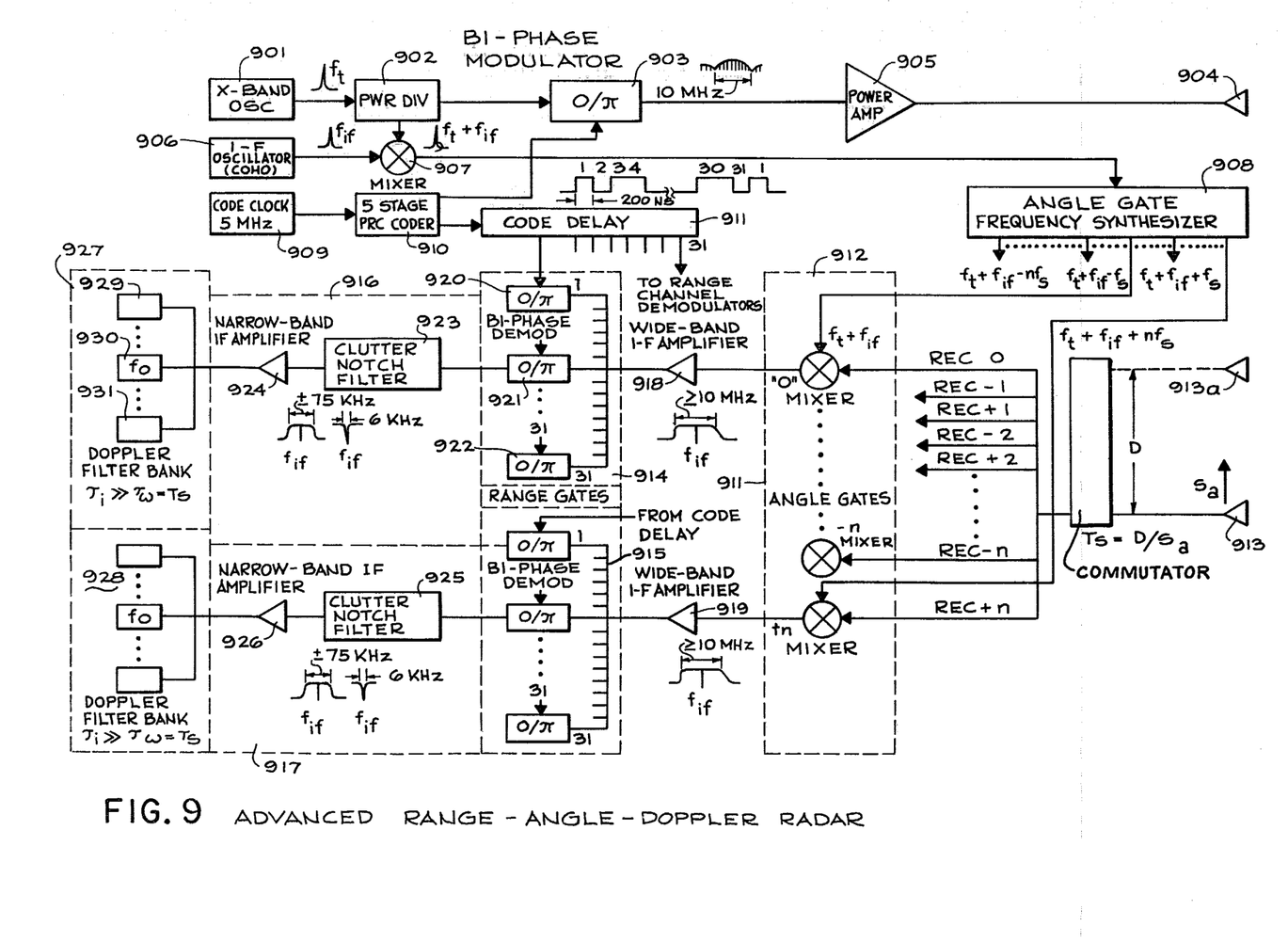
FIG. 9 is a typical system block diagram of an overall device according to the invention.
Figure 10:
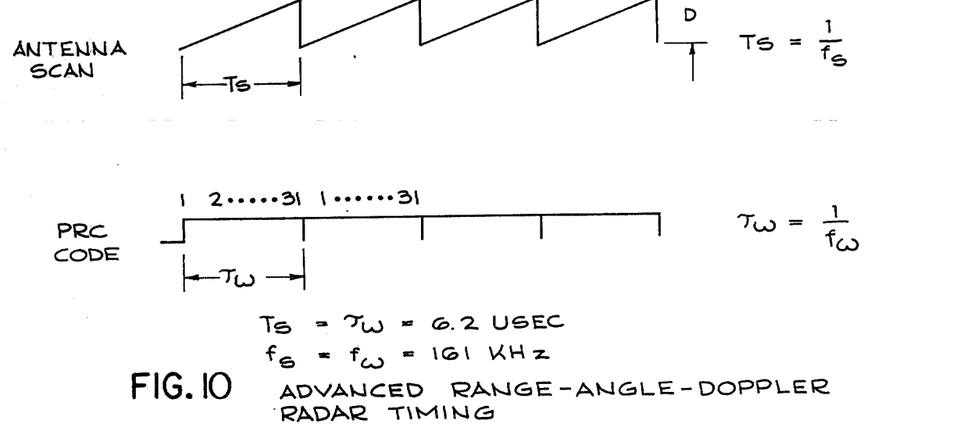
FIG. 10 is a timing diagram relating to the PRC code word and antenna scan timing.

Referring now to FIG. 9, the overall system block diagram of a typical arrangement according to the invention is shown. Note that that the transmitter section comprising a X-band oscillator 901, bi-phase modulator 903 and antenna 904, is equivalent to the same components in FIG. 1(a). Also, in the general case shown, a complete PRC receiver channel (as previously identified) would be associated with each angle gate (or beamwidth). This angle gate is formed by the first mixer in each receiver which is fed by a local oscillator signal at $f_t + f_{if} + nf_s$, where n is equal to the corresponding antenna beam at n $(\lambda/D)$. These local oscillator signals are generated coherently in synthesizer 908 which is a multi-frequency generator in effect. As shown in FIG. 10, the antenna scan period $T_s$ is made equal to the PRC word period, $\tau_w$. In this manner, both the criteria for proper PRC ranging without encountering Doppler ambiguities, $$f_w \geq 2f_d\ (\text{max})$$

and the criteria for angle gating $$f_s \geq 2f_d\ (\text{max})$$

are both met.

In addition, if $f_w = f_s$, it is less likely that unwanted beat frequencies will be created.

Assume first that a target is exactly at $\alpha = (n\lambda/D)$, a compensating angle point with a Doppler $f_d$. In the n-th receiver channel (or angle gate), the receiver response will be that of a conventional prior art PRC radar since the antenna scanning modulation is compensated for as previously described. The filter at $f_d$ will be excited in the range gate (receiver) channel corresponding to the target range. The other range gates will not correlate properly, and the corresponding $f_d$ filter response will be down by the PRC correlation function $1/L^2$ as predicted by PRC radar ambiguity diagram of FIG. 3.

If we place the target at $\alpha = (n\lambda/D)$ and look at the adjacent angle receivers (or angle gates), the local oscillator compensation will move the entire PRC spectrum by $f_s = f_w$. Here $f_s$ is the scan frequency (commutation rate) and $f_w$ is $1/\tau_w$, i.e., $f_w$ is the code word repetition frequency. This is equivalent to a PRC spectrum with a Doppler of $f_d + f_w$. After PRC correlation in the range gate in which the target lies, a single line at $f_d + f_w$ will result. Since the narrow band i-f cuts off at $f_w/2$, the signal will not be detected.

If we look at the other range gates in the adjacent angle receiver channels, the response is that of a PRC radar which is out of range but at the first Doppler ambiguity reponse of the PRC ambiguity diagram. Thus the response will be down only 1/L again as predicted by the PRC ambiguity diagram. The same reasoning can be applied to other than the adjacent receiver channels.

When the target is between the $\alpha = (n\lambda/D)$ points, the situation is more complicated because the scan modulation causes additional lines to be generated at multiples of $f_s$ (see FIG. 6). The worse case appears to be when a target is exactly between two compensation angle points, for example at $\lambda/2D; 3\lambda/2D$, etc.

As discussed previously in the angle measurement sections, the corresponding two adjacent receivers will have equal responses and be down 3 dB from maximum response at $(n\lambda/D)$. The out-of-range gate response in these corresponding two adjacent receivers will be down by $1/L^2$ from the response in the in-range gate response (which is down 3 dB). Other angle-gated receiver channels will be affected by the sin x/x response of the scan modulation as well as the PRC ambiguity diagram response. The unwanted responses, however, may be expected to be on the order of 10 dB predicted by the sin x/x response of FIG. 6 since the PRC unwanted response is on the order of 15 dB.

On FIG. 9 it will be noted that the oscillator 901 is identified as an X-band device, this being a typical radar frequency. The power divider 902 connected to 901 passes most of the relatively low band power of 901 to the bi-phase modulator 903. However, a small amount is diverted to mixer 907 where it is mixed with the output of a stable IF oscillator (coho) 906. The frequency of 901 is identified as $f_t$ and that of the coho 906 as $f_{if}$, accordingly the output of mixer 907 is $f_t + f_{if}$. The output of 907 drives the angle gate frequency synthesizer 908 directly, this synthesizer being no more than a multiple frequency generator synchronous with the output of mixer 907. In this way, the multiple local oscillator signals generated by 908 provide phase coherence throughout the signal processing functions following the mixer group 912.

The power amplifier 905 picks up the bi-phase modulated output of 903 and provides wideband amplification thereof, at least sufficient to accommodate the approximately 10 MHz bandspread at the output of 903. Subsequently the antenna 904 radiates this energy. The antenna 904 is much the same as a standard PRC sector illuminating radiator and need be no more than a relatively straightforward and simple horn radiator. Later, in connection with FIG. 13 the overall antenna arrangement which would be typical of the combination of the present invention will be discussed in more detail.

As is well known in PRC generation, a code clock 909 in this example, running at 5 MHz, drives the 5 stage PRC coder 910, this arrangement being substantially the same as that of FIG. 1(a). The output of coder 910 not only supplies the maximal length sequence to modulator 903 but also drives the 5 stage binary code delay device 911. This device is ordinarily no more than a standard device of one code word total delay with 31 taps, whereby the 31 bits of the code word (the bit duration being typically 200 nanoseconds in this example) are presented at the taps before the word repeats itself. The total word duration $\tau_w$ being 6200 NS in this example, the first redundant range is therefore approximately 930 meters, however, as hereinbefore indicated, the separate technique described in U.S. patent application Ser. No. 634,890 filed Nov. 24, 1975, entitled Pseudo-Random Code (PRC) Surveillance Radar, can readily be added to the total structure to increase this first redundant range greatly.

Figure 8:
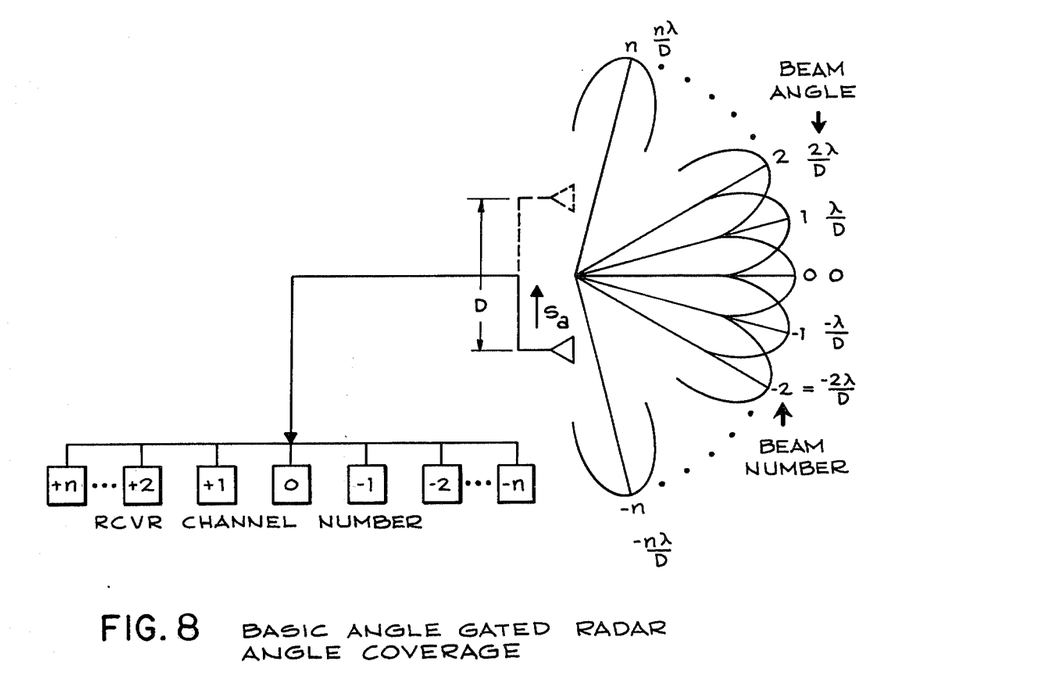
FIG. 8 illustrates the relationship between various angles (beams) in space as related to FIGS. 4 and 7.

Referring now to the antenna 913 which is assumed (for simplicity at this point) to move laterally and linearly with a velocity $S_a$ (see also FIG. 10) occupies extreme positions 913 and 913a. It is assumed to return from 913a to the 913 position in zero time for the sake of explanation. The output of this antenna which receives the reflected signals from targets illuminated by 904, branches into each of the 2n+1 receiver channels within block 912. Reference back to FIG. 8 will explain this 2n+1 figure. From the output of block 912, each of the mixers therein comprising the illustrated zero mixer, the minus n mixer and the plus n mixer, as well as all the remaining ones of the 2n+1 mixers, includes a wideband IF amplifier typically 918 or 919 following it. These wideband IF amplifiers have a bandwidth of at least 10 MHz centered about $f_{if}$ in order to accommodate the PRC modulation still present at this point.

The mixers within 912 and these wideband IF amplifiers of which 918 and 919 are typical, comprise the receiver channels variously referred to herein. Each of the mixers within 912, having its discrete local oscillator frequency provided by 908 corresponds to a beam (angle gate or angular bin) depicted in FIG. 8. Although beams corresponding to these discrete angle "bins" are not actually formed in space, the performance of the overall equipment has very much the equivalent effect and the term "beam" is very often used in this connection and in synthetic aperture radar situations in general.

Two decoder blocks, 914 and 915, are illustrated. It is to be understood that one such decoder block is provided for each of the 2n+1 receiver channels aforementioned, and within each of these decoder blocks, for example 914, the phase coincidence detectors shown, typically 920, 921, and 922, are only three of the 31 such circuits present in 914 and the other such decoder circuits. These demodulator blocks may be also characterized as range channel demodulators, the correlation process being carried out therein. In addition, the received signal corresponding to that angle gate (beam), for example as received from 918, is fed in parallel to all 31 coincidence circuits of 914. The other input of each of these 31 coincidence circuits of 914 comes from a discrete corresponding one of the 31 outputs of the delay device 911. Concerning that delay device 911, it will be obvious to those skilled in this art that suitable implementations can be obtained from the technologies of delay lines, shift registers or the like.

The blocks 914 and 915 and their companions are followed by blocks typically 916 and 917, the latter containing a clutter notch filter, typically 923 or 925 followed by narrowband IF amplifiers 924 and 926, respectively. The clutter notch filters 923 and 925 merely eliminate frequency components corresponding to non-moving signals, i.e., those whose spectral content does not contain target Doppler (velocity) modulation components. At this point, the PRC coding is no longer present, the inputs to blocks such as 916 and 917 being passable through a bandpass filter having a bandwidth on the order of 75 KHz centered around $f_{if}$. These blocks 916 and 917, come directly from PRC technology and it will be realized that one clutter notch filter and narrowband IF amplifier follows for each of the 31 coincidence circuits for each of the 2n+1 correlators of which 914 and 915 are only typical. Thus, the output of each narrowband amplifier, such as 924 for example, represents a discrete range within a discrete beam or angular "bin." Each of these narrowband IF amplifiers is then capable of indicating at its output in respect to presence or absence of a signal within that range bin and angle bin. Doppler filter banks, typically 927 and 928, following each of those narrowband IF amplifiers, as illustrated at 927 comprising filters 929, 930 and 931 typically. The number of filters in 927 or 928 or any of the other filter banks provided is determined by the velocity resolution desired essentially without regard to other system parameters.

Figure 11:
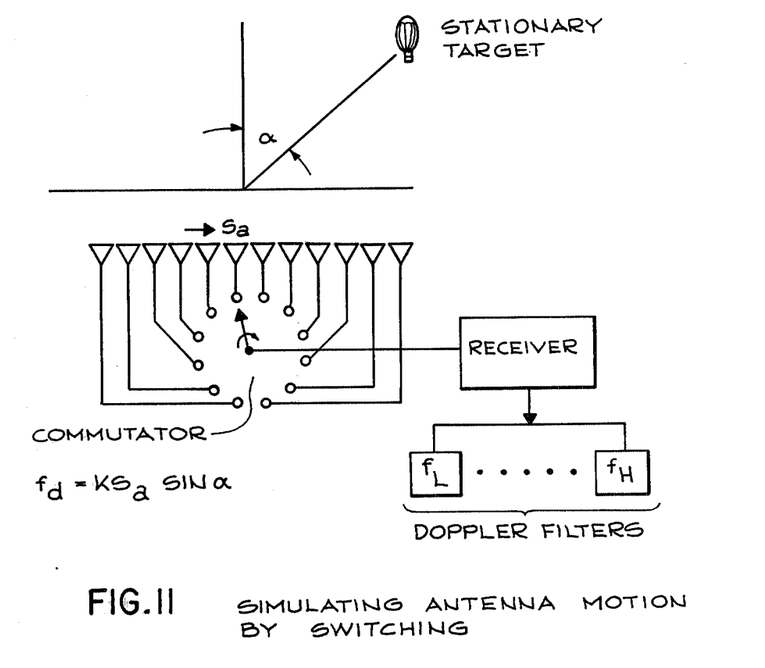
FIG. 11 illustrates the simulation of antenna motion by switching (commutation).

At this point, the significance of FIG. 10 having been already appreciated (namely that it places $T_s = \tau_w$, reference is made to FIG. 11. In a practical system, the antenna 913 which is assumed to move physically over the distance D in FIG. 9 or in FIGS. 4 and 7 would normally be replaced by a linear array of radiators separately fed through a commutating arrangement in accordance with FIG. 11. FIG. 11 is otherwise self-explanatory.

At this point in the discussion it will be realized by those skilled in this art that a simpler system can be configured it one were willing to search with a single angle gate and/or a single range gate per angle channel. Such a modification can be instrumented once the principles of the present invention are clearly understood. In that event, the block 912 of FIG. 9 would contain only one mixer and the angle gate frequency synthesizer 908 would issue a programmed local oscillator frequency. Moreover, in such a variation, the correlation process could be carried out by a searching range gate against the output of a single wideband IF amplifier following a single mixer of the block 912.

Figure 12:
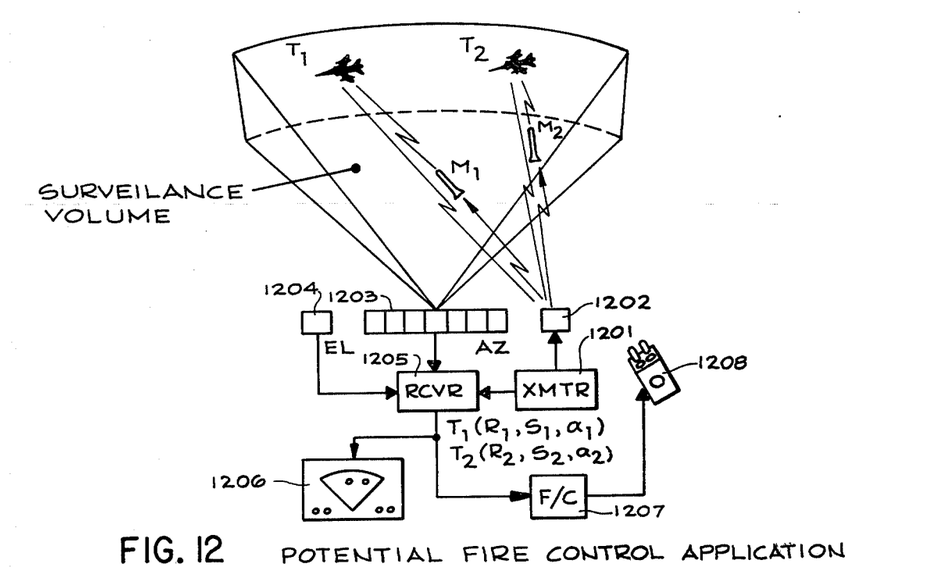
FIG. 12 illustrates the application of the system according to the invention to a fire control application.

FIG. 12 illustrates a potential fire-control application in which a transmitter 1201 and surveillance volume illuminating antenna 1202 transmit the CW PRC modulated signals as already described.

In FIG. 12 the commutated receiving antenna 1203 is, as already described, and an additional receiving antenna 1204 is vertically oriented in order to provide the same angle gating function in elevation as is provided in azimuth. The receiver 1205 then provides multiple channels for each of the 1203 and 1204 antennas from which target range, velocity and angle information issues, to an indicator 1206 and also to a control unit 1207 relating to missile launcher 1208.

From this complete range, angle (in two dimensions) and Doppler information missiles $M_1$ and $M_2$ can be programmed toward the targets $T_1$ and $T_2$. That is, the seeker-receiver in the missile can be "locked-up" in range, angle and velocity. The semi-active missiles can then utilize reflected energy from targets resulting from the illumination by 1202 to home on target.

The unique advantage in ground-to-air missile (defense) system in employing the present invention is the increased fire power provided by the capability for parallel missile firing. This capability follows from the contemporanenous range, angle and velocity data for multiple targets which the system of the invention provides.

Figure 13:
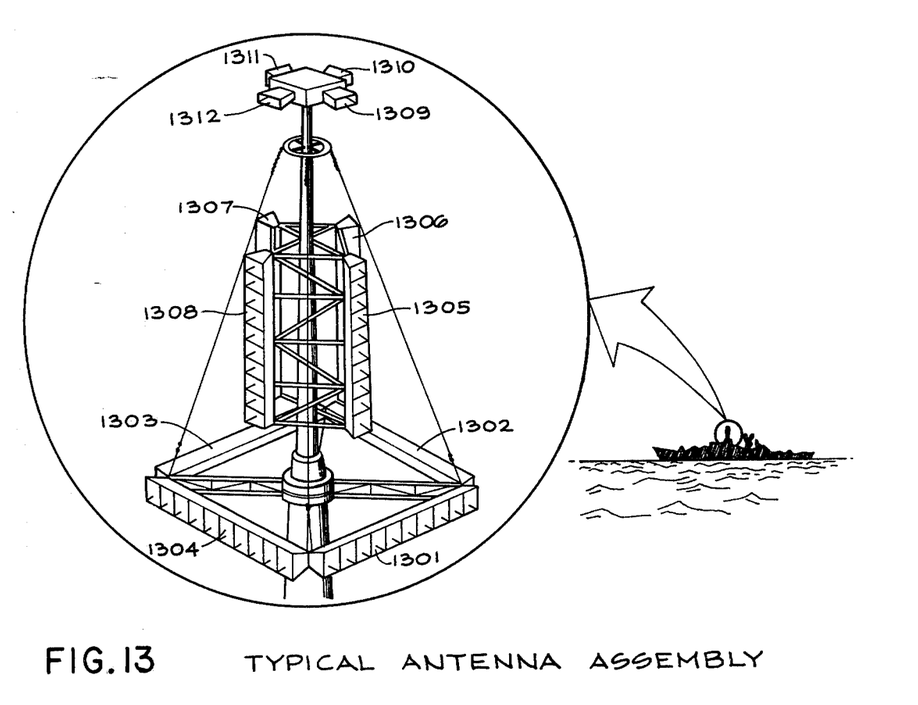
FIG. 13 illustrates a typical antenna assembly for azimuth, elevation, and target illumination in each of four quadrants.

Referring now to FIG. 13, a configuration of antennas is illustrated from which the entire 360° about any given location can (through switching selection) be subjected to the surveillance and control capabilities of the present invention. In azimuth, four multi-element commutatable arrays 1301, 1302, 1303, and 1304 are shown which are selectively employed contemporaneously with one of the elevation arrays 1305, 1306, 1307, or 1308, respectively. A four quadrant transmitting (illuminator) antenna arrangement comprising horns 1309, 1310, 1311, and 1312, is shown, it being understood that the appropriate one of these is also selected for the space quadrant of interest.

The employment of elevation angle determination in accordance with the present invention of course requires duplication of the angle gating functions of FIG. 9, but the pseudo-random range and Doppler velocity determining functions need not be duplicated. The manner of integrating the elevation operation into the arrangement of FIG. 9 will also be evident to those skilled in this art once the principles of the present invention are well understood.

Other modifications and variations and details of arrangements of the system described may present themselves to those skilled in this art, and accordingly, it is not intended that the scope of the present invention should be regarded as limited to the embodiment depicted in the drawings or this description, these being typical or illustrative only.

What is claimed is:

1. A range and angle determining Doppler radar comprising:
    first means for generating a CW RF carrier, pseudo-random code generating means, and means for modulating said CW RF carrier with said code and for radiating the resulting signal;
    second means including a multi-element antenna array for receiving echo signals corresponding to objects illuminated by said first means;
    third means for commutating the elements of said array at a predetermined rate, said third means having a common antenna port, such that each element of said array is connected in succession to said port;
    fourth means responsive to signals at said port including a plurality of receiver channels and frequency synthesizer means connected thereto to provide a discrete local oscillator signal to a corresponding mixer in each of said receiver channels, said receiver channels each being thereby discretely tuned to a frequency component representative of an angle in space with respect to said array;
    and correlation detection means responsive to each of said receiver channels and to said pseudo-random sequence generated in said first means to provide range determination at each of said angles in space.

2. Apparatus according to claim 1 including a plurality of banks of Doppler filters, one of said banks responsive to the output of each of said correlation detection means to provide an output representing the discrete target velocity for each of said angles.

3. Apparatus according to claim 1 in which said pseudo-random code generating means within said first means comprises digital logic circuits for repetitively generating a maximum length sequence and said means for modulating said RF carrier comprises a bi-phase modulator.

4. Apparatus according to claim 3 in which said array of said second means comprises a linear array of substantially equally spaced radiators and said radiating means of said first means comprises an antenna having a radiation pattern covering at least a predetermined angular region extending on both sides of a line normal to said linear array.

5. Apparatus according to claim 1 in which said array of said second means comprises a linear array of substantially equally spaced radiators and said radiating means of said first means comprises an antenna having a radiation pattern covering at least a predetermined angular region extending on both sides of a line normal to said linear array.

6. Apparatus according to claim 5 in which the line of said linear array is defined as lying substantially in a horizontal plane and said angular region on both sides of said array normal is an azimuth angle, said antenna of said first means having a radiation pattern at least covering a solid angle therefrom bounded by said predetermined angle on both sides of said array normal in azimuth and a predetermined elevation angle.

7. Apparatus according to claim 5 in which said code-generating means comprises means for generating said code as a repetitive digital word of $\tau_w$ duration, and in which said third means is defined as including means for providing said predetermined rate of commutation of said array elements so as to complete a cycle of commutation in a time approximately equal to said $\tau_w$.

8. Apparatus according to claim 1 in which said code generating means of said first means comprises means to generate a binary coded maximal sequence having a word duration $\tau_w$ and n bits each of duration $\tau_b$, said modulating means comprises a bi-phase modulator responsive to said code generating means, and in which each of said receiver channels of said fourth means comprises a first IF amplifier following each corresponding mixer and preceding said correlation detection means, said first IF amplifier having a bandwidth sufficiently broad to pass the IF spectrum resulting from reception of pseudo-random coded signals through said array of said second means, said first IF amplifier bandwidth being sufficiently narrow to substantially reject signals having frequency components substantially outside the IF frequency spectrum corresponding to said coded signals for the corresponding angle in space.

9. Apparatus according to claim 8 in which said correlation detection means comprises a discrete binary coincidence detector of n stages each having first and second inputs, and including a delay device responsive to said binary code maximal sequence generating means, said delay device having a total delay of $\tau_w$ and having n equally spaced taps to provide a delayed local code, each of said taps being connected to a second input of one of said coincidence detector stages, said coincidence detector having an output providing the autocorrelation function of said delayed local code and received signals from said first IF amplifier.

10. Apparatus according to claim 9 including means for synchronizing said frequency snythesizer from said CW RF carrier generator of said first means.

11. Apparatus according to claim 9 including an IF coho oscillator at frequency $f_{if}$ and a synthesizer drive mixer, said mixer being connected to said coho oscillator and the $f_t$ signal generated by said RF CW carrier generator to develop a signal $f_t + f_{if}$, said frequency synthesizer being synchronized therefrom to provide coherent signal processing of received signals through said receiver channels and said correlation detection process.

12. Apparatus according to claim 8 in which said code-generating means contains means synchronized from said first means for providing said predetermined rate of commutation of said array in a manner so as to complete a cycle of commutation during transmission of said pseudorandom code word by said first means.

13. Apparatus according to claim 1 in which said code-generating means comprises means for generating said code as a repetitive digital word of $\tau_w$ duration, and in which said third means is defined as including means for providing said predetermined rate of commutation of said array elements so as to complete a cycle of commutation in a time approximately equal to said $\tau_w$.

14. A radar system for contemporaneous angle and range measurement for plural targets within a predetermined solid sector of space, comprising:
first means for transmitting a CW RF signal modulated by a repetitive, digital, pseudo-random maximal sequence covering at least said solid sector of space;
second means including a receiving antenna and scan means whereby the effective instantaneous point of reception provided by said receiving antenna is varied cyclically over a predetermined distance to impose a phase modulation on received echo signals resulting from illumination of targets by said first means such that a frequency spectrum centered about a different discrete frequency corresponds to each discrete angle within said space sector;
and third means responsive to said second means for separating received signals into channels by said discrete frequencies and therefore in accordance with target angle with respect to said receiving antenna, said third means also including means operative within each of said channels for determining target range by autocorrelation of said transmitted maximal sequence against the same code on the corresponding received echo signal.

15. Apparatus according to claim 14 in which said second means includes Doppler measuring means for measuring target velocity in each of said channels, said Doppler measuring means thereby providing velocity information corresponding to each target range within a discrete angle bin.

16. A range and angle measuring radar system comprising:
first means for illuminating a predetermined solid sector of space with a CW transmitted signal modulated by a maximal length pseudo-random sequence;
second means including an antenna array having a plurality of elements each arranged to receive echo signals from targets illuminated by said first means along a different path in space;
scan means for sampling said array elements sequentially at a predetermined rate, thereby generating a scan modulated received signal in which a discrete frequency represents each angle of incidence of a corresponding echo signal at said array;
and third means including a correlation detector for separately processing said discrete frequencies to determine range in a corresponding channel representative of echo signal angle of arrival.

* * * * *